April 6, 1954          P. WILLIAMS          2,674,726
AMBIENT LIGHT-CONTROLLED FLASHING SIGNAL
Filed April 5, 1951
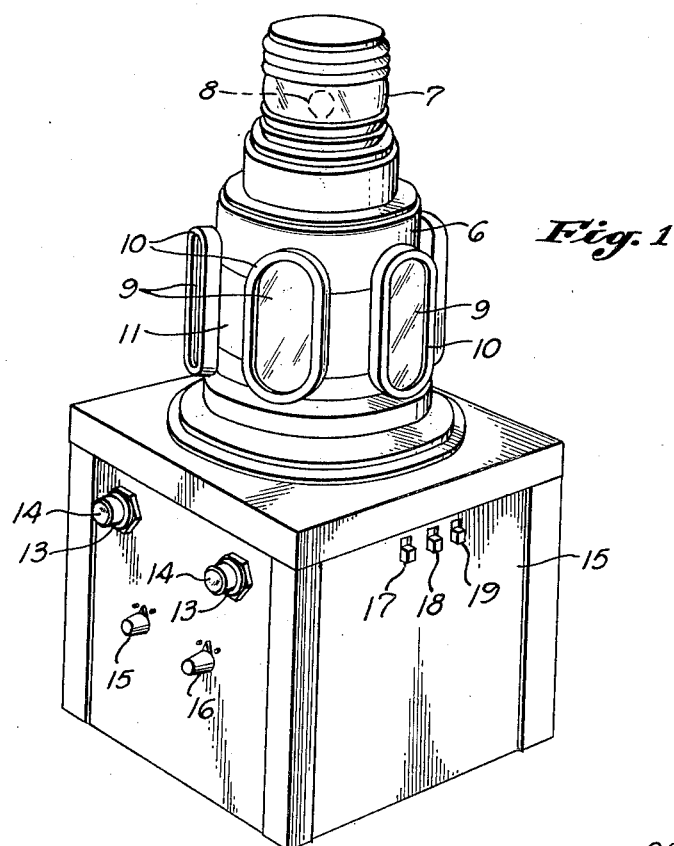
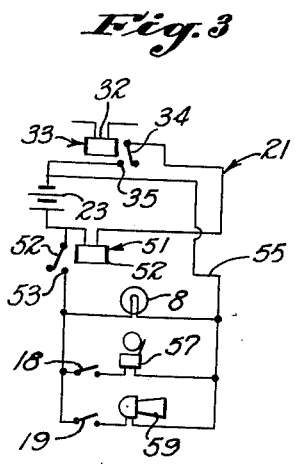
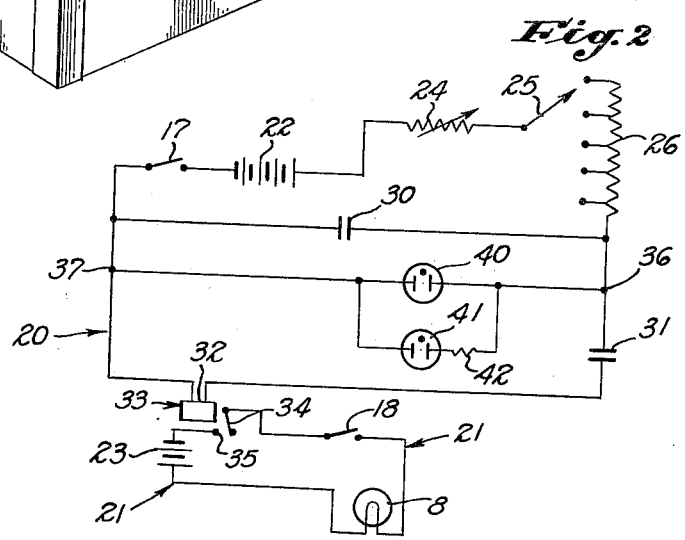
INVENTOR:
PAUL WILLIAMS
BY HIS ATTORNEYS
HARRIS, KIECH, FOSTER & HARRIS Patented Apr. 6, 1954

2,674,726

UNITED STATES PATENT OFFICE 2,674,726

AMBIENT LIGHT-CONTROLLED FLASHING SIGNAL

Paul Williams, Los Angeles, Calif.

Application April 5, 1951, Serial No. 219,445

2 Claims. (Cl. 340—25)

1

My invention relates to signaling devices and more particularly to a self-contained device which will emit intermittent signals of a visual type and, if desired, of an audible and/or radio type for long periods of time. The invention relates also to a novel flasher circuit. It will be exemplified as a flashing warning or distress signal.

Present flashing devices conventionally employ motor-driven switches or thermal relays, particularly if located convenient to power lines. Self-contained flashing devices, e. g., those that are battery operated, are both bulky and short-lived when employing such motor-driven devices or thermal relays. A thermal relay, for example, usually consumes more current in its operation than is required to flash a connected lamp.

It is an object of the present invention to provide a signaling or flasher device which is very economical to operate and which has an exceedingly long life. For example, the present device will emit a brilliant flash from a lantern bulb for a period in excess of 500 hours when this bulb is energized from a conventional 6-volt lantern battery. The best thermal relay operation of the same bulb by use of the same battery will usually have a life no greater than 70 hours.

It is an object of the present invention to provide a device in which the load circuit is separate from the flasher or control circuit, these circuits being energized by use of separate sources of potential, e. g., separate batteries and/or other source of electrical potential. Thus, the lamp or other load in the load circuit forms substantially the only load for the battery in this circuit. Likewise, the flasher or control circuit can be energized from a separate source of potential best suited to its requirements.

It is another object of the invention to provide a flasher or control circuit of extremely long life even if energized from a small B-type battery of relatively high voltage, e. g., a battery of the type employed for B-supply purposes in a radio set or hearing aid. In fact, it is an object of the invention to provide a flasher or control circuit that will have a much longer life than the battery in the load circuit, whereby the flasher or control circuit may continue to operate even should the battery in the load circuit become ineffective. The flasher or control circuit to be described is capable of millions of trouble-free operations and will normally have a continuous-service life greater than one year.

It is another important object of the invention to provide a device which will emit a signal from

2 the flasher or control circuit throughout its prolonged life, and even if the load circuit should break, its make-and-break contacts stick or its source of potential become discharged or disconnected. In this connection, it is an object of the invention to employ a gaseous discharge tube in the flasher or control circuit to actuate intermittently a relay having contacts in the load circuit. A further object of the invention is to expose the gaseous discharge tube to give a lesser visual signal capable of flashing for a period of a year or more without attention even when the circuit is energized from a relatively small battery.

A further object of the invention is to provide a signaling device which can be made to emit a flashing signal only at night or when the ambient illumination becomes so low that a need for the flashing signal exists. In this connection, it is an object of the invention to expose the gaseous discharge tube to the ambient illumination and to make it serve in the dual function of triggering the flasher circuit and automatically controlling the main circuit to flash only when the ambient light is of low intensity.

A further object of the invention is to employ two gaseous discharge tubes permanently in the flasher or control circuit and so connected that one tube becomes operative automatically should the other fail. This insures long intermittent energization of the flasher or control circuit even in the event of failure of one of the gaseous discharge tubes.

A further object of the invention is to provide a signaling device which has but one moving part and which will remain operative independent of change of position. This feature is of particular advantage in portable equipment or when mounted on buoys marking harbor channels, the location of fishing nets or the location of distressed persons or objects subject to wave motion. Such buoys are often subject to a sway of 60°–80° or more, and most types of conventional flasher circuits will not give satisfactory operation under such extreme and rapid changes in position. The present invention will operate satisfactorily in any position and will not be rendered inoperative by relatively quick changes in position.

While the present invention is admirably suited as a distress signal, useful on land or sea, to emit distress signals at a predetermined and adjustable frequency, it is also well suited to use in conjunction with traffic signals, isolated highway signs, aircraft beacons or field-landing lights, isolated lighthouses, etc. All these and other uses are contemplated among the objects of the present invention.

Further objects and advantages of the invention will be evident to those skilled in the art from the following description of an exemplary embodiment.

Referring to the drawing:

Fig. 1 is a perspective view of the invention embodied in a distress signaling device;

Fig. 2 is a wiring diagram of the device of Fig. 1; and

Fig. 3 is a wiring diagram of an alternative load circuit.

The compactness of the device is exemplified in Fig. 1 which illustrates a cubical box or container 5 which need be no larger in size than a few inches in each direction and which can be readily portable or mountable on a buoy or the like or placed on the ground or on any object to emit visual and/or audible signals over long distances. On the top of the box or container 5 is mounted a hood or dome 6 which in turn supports a lens 7 in which is disposed a bulb 8 which is flashed by the circuit to be described. The lens 7 is usually of the Fresnel type and may be suitably colored, if desired, to emit a beam from all sides and which may be made directional in a horizontal plane by suitable lens design. For emission of a signal during daylight hours and particularly when the device is attached to a buoy, a series of reflecting elements 9 may be used. Such reflecting elements are preferably of the type reflecting any ambient or incident light either in a random or concentrated pattern. If desired, such reflecting elements may be respectively mounted in frames 10 secured to a band 11 which can be slipped around the dome 6 and held in place frictionally or by being secured to the dome in any suitable way.

Mounted on the box or container 5 at any suitable position to receive the ambient light or to transmit an auxiliary signal are two housings 13 carrying lenses or windows 14 through which light may be transmitted to and from two gaseous discharge tubes to be described. Suitable control knobs 15 and 16 may be exposed exteriorly of the container 5 for the purpose of controlling the flash frequency. Likewise, an on-off switch 17 may be exposed, together with auxiliary switches 18 and 19 that may be used, if desired, to switch into operation other signaling devices.

It will be understood that the box or container 5 may house, in a water-tight manner, all of the circuit components suggested in Fig. 2 except that certain audible signaling devices, if used, may be mounted exteriorly thereon.

Fig. 2 shows a system in which separate energizing and control circuits are employed, the flasher or control circuit being indicated by the numeral 20 and the load circuit by the numeral 21, these circuits including separate potential sources 22 and 23. The potential source 22 may be a B-type battery of small size and of higher voltage than the source 23, being typically a 135-volt B battery with the on-off switch 17 connected serially therewith.

Also connected serially with the source 22 is an impedance means comprising a resistor means illustrated as including a variable resistor 24 connected serially with an arm 25 of a tapped variable resistor 26. The control knob 15 may be connected to the variable resistor 24 to effect minor changes in flashing frequency. Likewise, the arm 25 of the resistor 26 may be connected to the control knob 16 to effect a step-wise change in flashing frequency.

Connected serially with the source and the aforesaid resistors 24 and 26 is an impedance means comprising a condenser means, preferably including a condenser 30 and a condenser 31. In circuit with the latter is a surge-responsive device. As shown, this includes a control winding 32 of an ultra-sensitive relay 33 having an armature 34 which actuates a contact means 35.

Connected between points 36 and 37 of the circuit is a gas-filled tube of the cold cathode type indicated as a gaseous discharge tube 40. This tube 40 is connected in parallel with, or across the condenser means in the sense of being connected directly in parallel with the condenser 30 and/or in parallel with the series-connected condenser 31 and control winding 32. A duplicate gaseous discharge tube 41 is connected in parallel with the tube 40, preferably with a very small impedance, typically a resistance 42, in series with one terminal of the tube 41 so that only one of the tubes will operate at a time. The resistance 42, if used, is merely a short extra length of the lead connected to the tube 41, e. g., a half inch of #20 copper wire, evidencing the extremely small resistance required to prevent simultaneous breakdown of the two tubes 40 and 41. In a manner to be more specifically described, the tube 40 or the tube 41 periodically energizes the control winding 32 of the relay to close its contact means.

The load circuit 21 connects serially the potential source 23 and the bulb 8, the circuit being closed when the contact means 35 is closed. If desired, the switch 18 may be disposed in the load circuit for manual control or this switch may be employed for switching a supplementary warning circuit, as suggested in Fig. 3. The source 23 is typically a lantern-type battery composed of electrolytic cells connected to give an output voltage of 6 volts. Such batteries are conventionally used in electric lanterns, and the bulb 8 may be a lantern-type bulb of corresponding voltage.

As to the flasher or control circuit 20, its components may differ widely in resistance, capacitance, etc., but the following will exemplify values or ranges that will be found operable when the source 22 is a 135-volt battery. The variable resistor 24 may have a total resistance of .5 megohm, the resistor 26 being tapped to provide ten steps each of a resistance of .5 megohm, more or less. Each of the condensers 30 and 31 may have a capacitance of 1 mfd., although the former may vary quite widely in capacitance. The one or more gaseous discharge tubes 40, 41 may be neon bulbs of the common NE-21 type rated at 110 volts and having an ignition or breakdown voltage of about 70 volts and an extinction potential of a lesser value or of a similar type in design and characteristics. The relay 33 is preferably a very sensitive one with its control winding 32 of relatively high resistance, e. g., about 10,000–18,000 ohms and typically about 16,000 ohms. A D. C. relay of the type known as Advance Ultra-Sensitive, series 1200, 100/110 microamperes, counterbalanced armature, has been found to be very satisfactory.

With such components, the system operates as follows. Upon closing the switch 17, the condensers 30 and 31 are charged through the resistor means comprising the resistors 24 and 26. The rate of rise in the voltage applied to the condensers is exponential and varies with the product of the resistance and capacitance. When the potential between the points 36 and 37 rises to the ignition or breakdown voltage of the tube 40, for example, this tube becomes conductive, and the charge of the condenser 31 creates a sudden current surge or pulse through the control winding 32 of the relay 33 and through the now-conductive tube 40. This current surge is sufficient to actuate the relay 33 and close its contacts momentarily, thus energizing the bulb 8 to produce a flash. As soon as the voltage between points 36 and 37 drops to the extinction voltage of the tube 40, this tube becomes non-conductive, the surge ceases, the load circuit opens, and the voltage across the condensers 30 and 31 begins to rise again at a rate determined by the setting of the resistors 24 and 26. The amount of current drawn from the source 23 is extremely small, being in the neighborhood of 100 microamperes with typical settings of the resistors, thus leading to extremely long life as concerns the flasher or control circuit which will operate continuously for 1,000 hours, or considerably more without renewal of the battery. Unless switched off, such a circuit will continue to operate until the battery voltage drops as low as about 25 volts or lower, measured by an ordinary high-resistance volt meter, even though it will not operate if a fresh 25-volt battery is employed. This is probably because the initial instantaneous available voltage of the nearly-run-down battery is still much in excess of the 25-volt figure measurable on a meter.

The gaseous discharge tubes 40 and 41 are mounted respectively in the two housings 13 so that such an auxiliary signal is visible. Each time the gaseous discharge tube 40 or 41 breaks down, it emits an auxiliary flashing signal, albeit of lower intensity than that obtained from the bulb 8. This is very desirable as it permits the device to emit a visible signal even if the relay 33 burns out or the contact means 35 of the relay stick and even though the bulb 8 burns out or its source 23 becomes discharged.

The placement of the condensers 30 and 31 in the circuit is important if this result is to be achieved. If the condenser 30 were eliminated, the circuit would not continue to flash if, for example, the control winding 32 of the relay 33 burned out. Additionally, the placement of this condenser 30 in parallel with the gaseous discharge tube 40 increases the intensity of the surge through the tube upon breakdown, thus increasing the intensity of the auxiliary signal and to some extent the duration of the surge and thus the duration of the flash of the gaseous discharge tube 40 and the bulb 8.

While the circuit will flash if the condenser 30 is changed in position to be connected directly across the condenser 31 or the latter is equivalently doubled in capacity, this change will not insure flashing of the gaseous discharge tube 40 to produce the auxiliary signal should the relay contacts stick or the control winding of the relay burn out. The same is true if the circuit were changed to dispose the control winding 32 of the relay in series with the gaseous discharge tube 40 between the points 36 and 37.

While not essential, the use of the two gaseous discharge tubes 40 and 41, connected in parallel and with the unbalancing resistor 42 in series with one, is an important supplementary feature of the invention. Should one of the gaseous discharge tubes burn out or become inoperative, this arrangement permits the other tube immediately to assume control and continue producing the auxiliary signal and the flashing of the bulb 8. With the unbalancing resistor 42, the tubes will not flash simultaneously and weakly. Instead, only one of the tubes will flash at a time and with substantial intensity.

It has been found that the gaseous discharge tube 40 or 41 has a sufficient photoelectric effect to control the relay-caused energization of the load circuit. This is believed to be due to a decrease and increase in the breakdown potential if tubes of this type are exposed respectively to light and darkness. By placement of these tubes in the housings 13 to receive ambient or incident light through the lenses 14, the above described load circuit will remain inactive during daytime hours or until the ambient or incident illumination is below a predetermined value. At this time the circuit will automatically begin to flash. During non-flashing periods, e. g., during daylight hours, the gaseous discharge tube will continue to flash the control circuit, albeit sometimes at a changed frequency, but the intensities of the current surges are not sufficient to close the contact means 35 of the relay, whereby the load circuit does not flash and there is a substantial increase in life of the source or battery 23.

The frequency of the intermittent signal can be controlled by changing either the resistance, e. g., of the resistor means comprising the resistors 24 and 26, or the capacitance, e. g., the capacitance of the condenser means comprising the condensers 30 and 31. Correspondingly, it is within the scope of the invention to use variable condensers 30 or 31 instead of or supplementary to the frequency variations made possible by the variable resistors 24 and 26. The circuit shown is capable of a wide variation in frequency, obtainable step-wise by adjustment of the resistor 26 and incrementally by adjustment of the resistor 24. The frequency range of the device is considerably better than naval requirements of a frequency of ½–10 seconds.

With the circuits shown in Fig. 2, the duration of each flash is determined by the short time the relay contacts are closed and thus by the length of the current surge produced by breakdown of the gaseous discharge tube 40, for example. However, in instances where the length of the individual flash is desirably longer, the load circuit of Fig. 3 can be employed.

Fig. 3 shows a control winding 50 of a relay 51 substituted in the load circuit 21 for the bulb 8. This relay is diagrammatically shown and provides an armature 52 and a contact means 53. It is desirably a time-delay relay, preferably adjustable to delay the time of the "on" period. Such relays are well-known in the art, and the delayed opening may be obtained by a dash-pot or other means. At the instant the current surge starts, the contact means 53 close, remaining so after the cessation of the current surge and because of the time-delay action of the relay. Correspondingly, it becomes possible to connect the bulb 8 in series circuit with the source 23 and the contact means 53 in a load circuit 55 to produce flashes from the bulb 8 of a duration determined by a setting of the relay. Such a time-delay relay 51 is preferably separate from the relay 33 as it is difficult to design the latter necessarily-sensitive relay to have a time-delay action.

The device is capable of operating supplementary signaling devices to give, for example, audible as well as visible distress signals. For example, a bell 57 can be incorporated in the load circuit 55 in parallel with the bulb 8 and preferably under the control of the switch 18. Similarly, a horn 59 can be incorporated in the load circuit under the control of the switch 19. A similar bell or horn can be incorporated in the load circuit of Fig. 2 without departing from the spirit of the invention.

Various changes and modifications can be made without departing from the spirit of the invention as defined in the appended claims.

I claim as my invention:

1. In a signaling device for emitting an intermittent visible signal, the combination of: a container; a gaseous discharge tube and means for mounting same to receive the ambient light reaching the exterior of said container; a source of potential; a resistor means; a condenser means; circuit means for connecting said condenser means and said resistor means to said potential source to charge said condenser means through said resistor means at a rate determined by the resistance of said resistor means and the capacity of said condenser means to increase progressively the potential between points in said circuit means, said gaseous discharge tube being connected between said points and having breakdown and extinction voltages within the range of the voltage excursion between said points to discharge said condenser means through said gaseous discharge tube upon breakdown thereof to create a current surge in a portion of said circuit means, said current surge ceasing when the voltage across said gaseous discharge tube drops to its extinction voltage and thus permitting said condenser means to be again charged through said resistor means until the voltage across said gaseous discharge tube again rises to the breakdown voltage thus producing sequential current surges, said current surges illuminating said gaseous discharge tube, said gaseous discharge tube having a photoelectric effect to change its breakdown voltage upon reduction in said ambient light intensity below a predetermined value.

2. In a signaling device for intermittently energizing a load and employing two sources of potential, the combination of: a relay including a control winding and a contact means; a first impedance comprising a resistor means; a second impedance comprising a condenser means; circuit means for connecting said condenser means and said resistor means to one of said potential sources to charge said condenser means through said resistor means at a rate determined by the resistance of said resistor means and the capacity of said condenser means to increase progressively the potential between points in said circuit means on opposite sides of said condenser means, said circuit means including a gaseous discharge tube connected between said points and having breakdown and extinction voltages within the range of voltage excursion between said points whereby said condenser means discharges through said gaseous discharge tube upon breakdown thereof to create a current surge in a portion of said circuit means continuing until the tube voltage drops to the extinction value whereupon said condenser means again charges to repeat the cycle and produce sequential current surges, said control winding of said relay being connected in said portion of said circuit means to actuate said contact means in response to said current surges; a container enclosing components of said circuit means including said gaseous discharge tube, said container being adapted for transmitting ambient light from the exterior of the container to said gaseous discharge tube, said gaseous discharge tube having a photoelectric effect to change the breakdown voltage and reduce the intensity of each current surge to a value insufficient to close said contact means of said relay unless the ambient light is below a predetermined intensity; and a load circuit including means for connecting said contact means and said load serially across said other potential source to energize said load therefrom upon actuation of said contact means.

References Cited in the file of this patent

UNITED STATES PATENTS

| Number | Name | Date |
|---|---|---|
| 1,185,814 | McElroy | June 6, 1916 |
| 1,762,811 | Charlton | June 10, 1930 |
| 1,932,477 | Rebori | Oct. 31, 1933 |
| 2,028,906 | Higgins | Jan. 28, 1936 |
| 2,040,425 | Biach | May 12, 1936 |
| 2,405,843 | Moe | Aug. 13, 1946 |
| 2,461,962 | Carlson | Feb. 15, 1949 |
| 2,478,908 | Edgerton | Aug. 16, 1949 |

FOREIGN PATENTS

| Number | Country | Date |
|---|---|---|
| 313,143 | Great Britain | May 16, 1930 |

OTHER REFERENCES

An article, "Limited Impulse and Delay Relays," August 1936. Electronic pp. 28–30.